United States Patent [19]

Blumenthal et al.

[11] Patent Number: 5,683,108
[45] Date of Patent: Nov. 4, 1997

[54] AIR BAG INFLATOR

[75] Inventors: Jack L. Blumenthal, Los Angeles; Lee D. Bergerson, Fountain Valley; Ivan L. Stonich, Hermosa Beach, all of Calif.

[73] Assignee: TRW Vehicle Safety Systems Inc., Lyndhurst, Ohio

[21] Appl. No.: 641,558

[22] Filed: May 1, 1996

[51] Int. Cl.⁶ .................................................. B60R 21/28
[52] U.S. Cl. .................................... 280/741; 280/737
[58] Field of Search ................................ 280/736, 737, 280/741

[56] References Cited

U.S. PATENT DOCUMENTS

| | | | |
|---|---|---|---|
| 3,173,992 | 3/1965 | Boop | 174/151 |
| 3,778,084 | 12/1973 | Sutherland et al. | 280/741 |
| 3,797,854 | 3/1974 | Poole et al. | 280/741 |
| 3,944,769 | 3/1976 | Wagner | 280/741 |
| 5,356,176 | 10/1994 | Wells | 280/737 |
| 5,496,062 | 3/1996 | Rink et al. | 280/737 |
| 5,609,361 | 3/1997 | Bergerson et al. | 280/741 |

Primary Examiner—Kenneth R. Rice
Attorney, Agent, or Firm—Tarolli, Sundheim, Covell, Tummino & Szabo

[57] ABSTRACT

An inflator (12) includes a vessel (30) having a chamber (34) containing inflation fluid under pressure for inflating an air bag (16). A plug (50) is located in an opening (52) into the chamber (34). The plug (50) has a fluid passage (72) for directing inflation fluid from the chamber (34) to the air bag (16). The plug (50) has a tapered surface (90) which partially defines an electrical conductor passage (82) extending through the plug at a location spaced apart from the fluid passage (72). A tapered seal member (100) is press fit into a tapered end portion (88) of the electrical conductor passage (82) in fluid tight sealing engagement with the tapered surface (90). An electrical conductor (126) extends through the electrical conductor passage (82) and through the seal member (100). The electrical conductor (126) is connectable with an electrical device (24), such as an igniter, in the chamber (34).

13 Claims, 3 Drawing Sheets 5,683,108

1

AIR BAG INFLATOR

BACKGROUND OF THE INVENTION

1. Technical Field

The present invention relates to an apparatus for inflating an inflatable vehicle occupant protection device, such as an air bag. In particular, the present invention relates to an air bag inflator having an electrical conductor which extends into a chamber containing fluid under pressure.

2. Description of the Prior Art

Known inflators for inflating a vehicle occupant protection device include a stored primary inflation fluid and an ignitable material. Upon the occurrence of vehicle deceleration which is indicative of a vehicle collision for which inflation of the air bag is desired, an electrical signal is transmitted to an igniter in the inflator. The igniter is actuated and the ignitable material within the inflator is ignited. As the ignitable material burns, it heats the primary inflation fluid. The heated primary inflation fluid is directed from the inflator into the inflatable device to inflate the device. The vehicle occupant protection device, when inflated, helps to protect a vehicle occupant during a collision.

SUMMARY OF THE INVENTION

The present invention is an apparatus for inflating an inflatable vehicle occupant protection device. The apparatus comprises a vessel having a chamber for containing inflation fluid under pressure for inflating the inflatable device. The vessel has an opening into the chamber. A plug is located in the opening. The plug has a fluid passage for directing inflation fluid from the chamber to the inflatable device. The plug has a tapered surface which at least partially defines an electrical conductor passage extending through the plug at a location spaced apart from the fluid passage. A tapered seal member is press fit in the electrical conductor passage in engagement with the tapered surface. An electrical conductor extends through the electrical conductor passage and through the seal member. The electrical conductor extends into the chamber and is connectable with an electrical device in the chamber. In a preferred embodiment, the electrical device is an igniter for igniting a combustible mixture of gases in the chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF SPECIFIC PREFERRED EMBODIMENTS OF THE INVENTION

Figure 1:
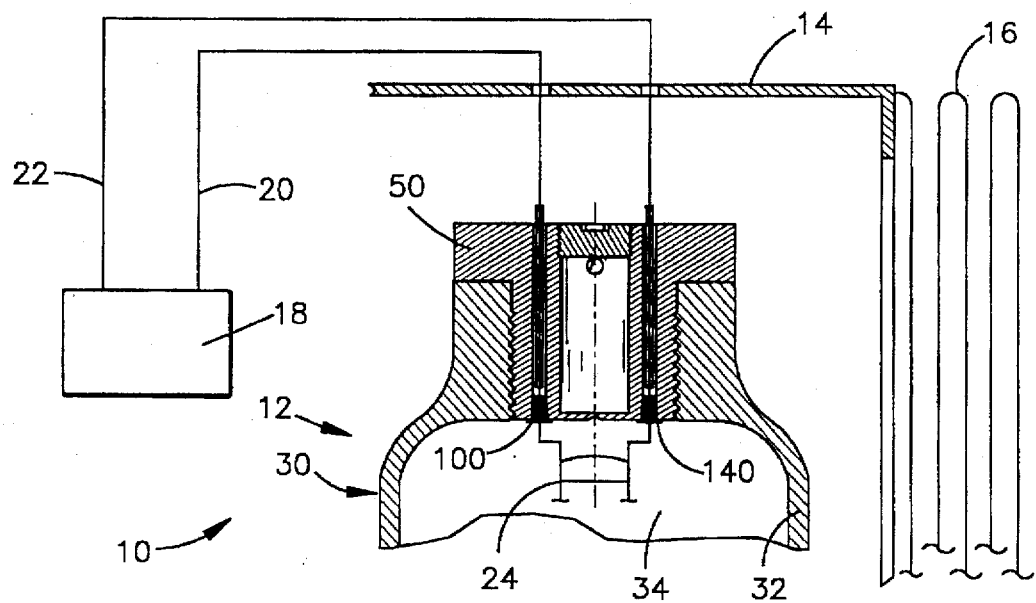
FIG. 1 is a schematic illustration of a vehicle occupant safety apparatus including an inflator which is constructed in accordance with the present invention.

The present invention relates to an apparatus for inflating an inflatable vehicle occupant protection device, such as an air bag. As representative of the present invention, FIG. 1 illustrates schematically a vehicle occupant safety apparatus 10 including an inflator 12 which is constructed in accordance with the present invention. The inflator 12 is disposed in a housing or canister 14. An inflatable vehicle occupant protection device 16, of the type commonly known as an air bag, is connected with the canister 14 and is inflatable by inflation fluid from the inflator 12 to help protect an occupant of a vehicle. The inflator 12, the canister 14 and the air bag 16 may be mounted in the instrument panel, steering wheel or other portion of a vehicle.

The vehicle safety apparatus 10 includes known means indicated schematically at 18 (FIG. 1) for sensing a collision involving the vehicle and for actuating the inflator 12 in response to the sensing of a collision. The means 18 may include a deceleration sensor and vehicle electric circuitry for actuating the inflator 12 in response to sensing a vehicle deceleration indicative of a vehicle collision having severity greater than a predetermined threshold value. In the event of an impact to the vehicle of a magnitude greater than the predetermined threshold value, the means 18 provides an electrical signal over electrical conductors 20 and 22 to the inflator 12. The inflator 12 is actuated in a manner described below to direct inflation fluid under pressure into the canister 14 and thence into the air bag 16 to inflate the air bag.

Figure 2:
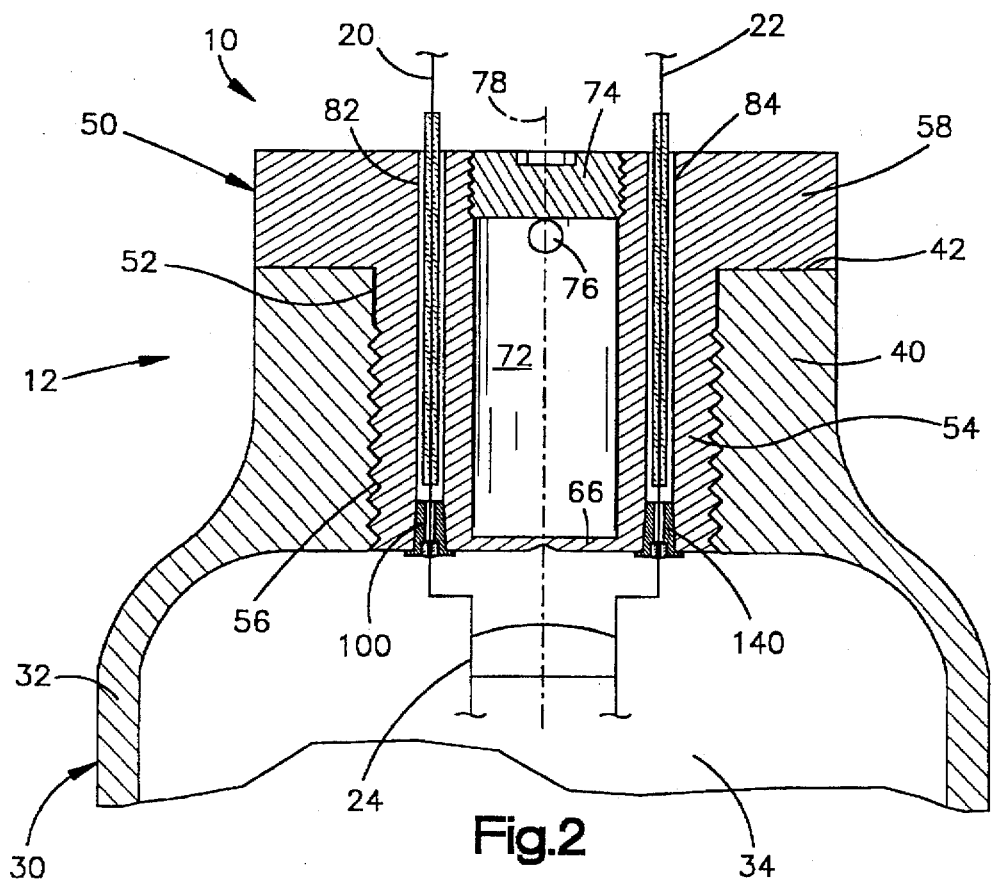
FIG. 2 is an enlarged view of a portion of the inflator of FIG. 1.

The inflator 12 includes a container or vessel 30 (FIG. 2). The vessel 30 is preferably made from a metal such as aluminum. The vessel 30 has a cylindrical side wall 32 which partially defines a chamber 34 in the vessel.

In the illustrated embodiment of the invention, the chamber 34 holds a combustible mixture of gases which includes a fuel gas, an oxidizer gas for supporting combustion of the fuel gas, and an inert gas. The inert gas is preferably nitrogen, argon or a mixture of nitrogen and argon. The oxidizer gas is preferably oxygen. The fuel gas is preferably hydrogen, but may be methane, or a mixture of hydrogen and methane. The mixture of gases in the chamber 34 readily combusts, when ignited, but otherwise is not explosive. Preferably, the mixture of gases is contained in the chamber 34 at a pressure of 1,000 to 3,000 pounds per square inch. Alternatively, the chamber 34 could contain a non-combustible gas or mixture of gases together with an ignitable material such as a pyrotechnic material.

The vessel 30 has a cylindrical neck portion 40 which defines an opening 52 into the chamber 34. At least a part of the surface of the neck portion 40 which defines the opening 52 has an internal thread convolution 56. An annular end surface 42 extends radially outward from the opening 52.

Figure 3:
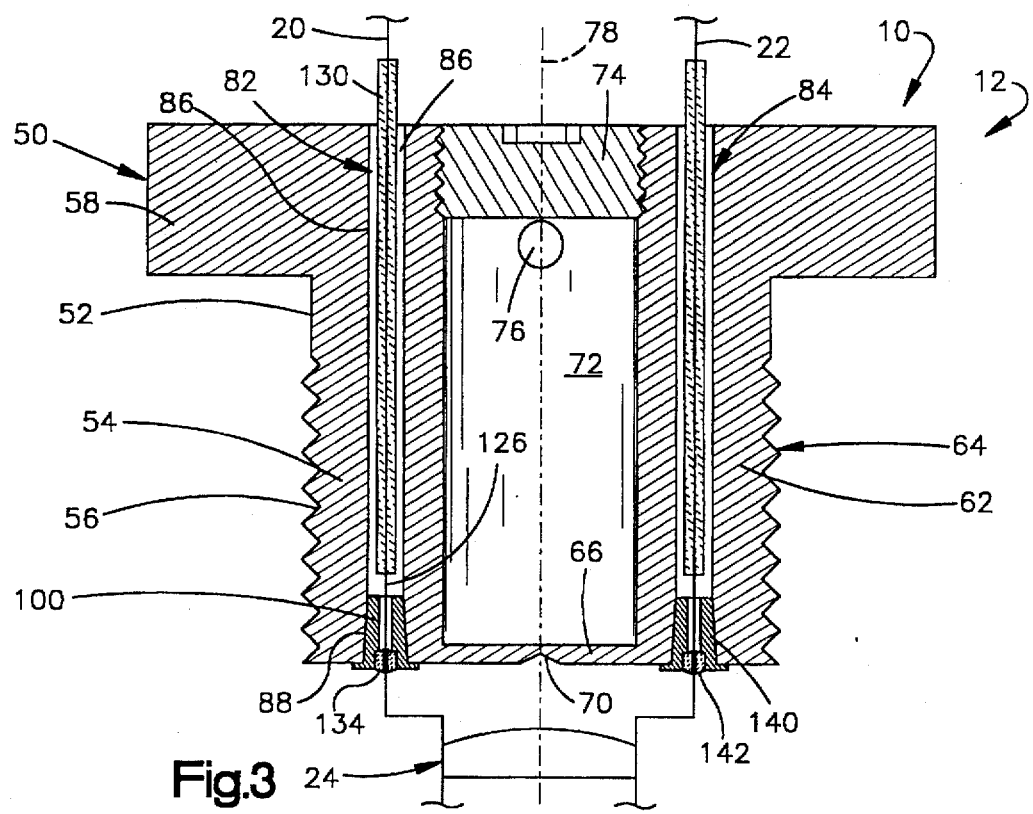
FIG. 3 is a further enlarged view of a portion of the inflator of FIG. 1.

A plug or closure member 50 (FIGS. 2 and 3) is located in the opening 52 in the vessel 30. The closure member 50, which is preferably made from aluminum, has a cylindrical body portion 54 and a radially extending flange portion 58. The body portion 54 of the plug 50 is threaded so that the plug 50 can be screwed into the internal thread convolution 56 on the neck portion 40 of the vessel 30 until the flange portion 58 contacts the end surface 42. If desired, the flange 58 on the closure member 50 may be welded to the neck portion 40 of the vessel 30 to help ensure a fluid tight seal between the closure member and the vessel.

The closure member 50 has a circular thin walled portion 66 which is formed as a burst disk. The burst disk 66 is disposed at an axially inner end of a cylindrical fluid passage 72 in the closure member 50 which extends along a central axis 78 of the inflator 12. The opposite, axially outer, end of the fluid passage 72 is closed by a circular metal end cap 74 which is screwed into the closure member 50. A plurality of passages 76 in the closure member 50 extend radially outward from the central passage 72 in directions away from the central axis 78 of the inflator 12.

A pair of electrical conductor passages 82 and 84 extend axially through the closure member 50 for enabling the electrical conductors 20 and 22 to extend into the cheer 34. Both passages 82 and 84 are parallel to the central fluid passage 72 and are disposed radially outward of the central fluid passage. The passages 82 and 84 are identical, and so only the passage 82 will be described in detail.

Figure 4:
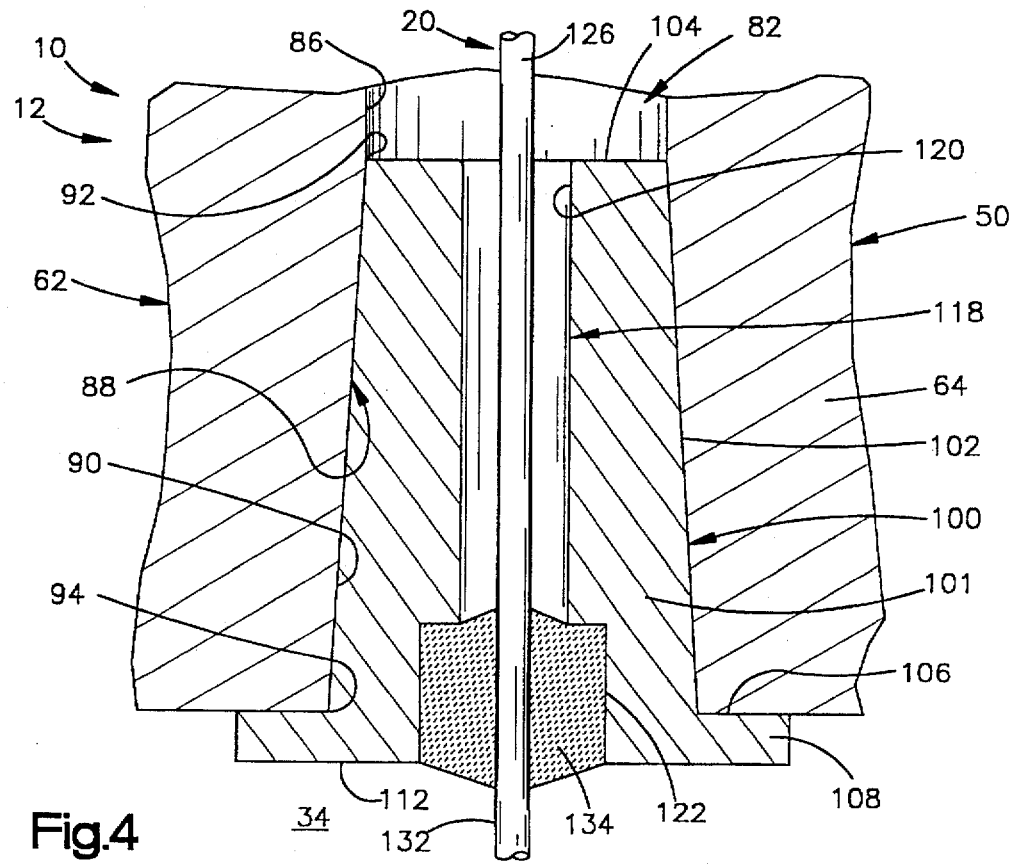
FIG. 4 is an enlarged view of a portion of FIG. 3.

The electrical conductor passage 82 has a relatively long, cylindrical, main portion 86 (FIGS. 3 and 4) and a shorter, tapered end portion 88 (FIG. 4). The end portion 88 of the passage 82 (FIG. 4) has an inner side surface 90 which is formed as a portion of a right circular conical surface. The side surface 90 has a circular inner end 92 of the same diameter as the cylindrical main portion 86 of the passage 82. The side surface 90 has a circular outer end 94 with a diameter which is greater than the diameter of the inner end 92. The end portion 88 of the passage 82 thus tapers axially from a larger diameter, at a location closer to the chamber 34, to a smaller diameter at a location farther from the chamber. The end portion 88 of the passage 82 tapers at an angle of approximately 4° relative to the axis 78.

A seal member 100 is connected with the closure member 50 for blocking leakage of fluid from the chamber 34 through the electrical conductor passage 82. The seal member 100 has a main body portion 101 (FIG. 4) which is disposed in the tapered end portion 88 of the electrical conductor passage 82. The main body portion 101 of the seal member 100 has an outer side surface 102 which is formed as a portion of a right circular conical surface. The outer side surface 102 of the seal member 100 extends between an annular inner end surface 104 of the seal member and an annular surface 106 on a radially extending flange portion 108 of the seal member. The seal member 100 has an axially extending central opening 118. The opening 118 has a relatively narrow, cylindrical main portion 120 and a relatively large diameter, cylindrical outer end portion 122.

The seal member 100 is press fit into the axially tapered end portion 88 of the electrical conductor passage 82 with a force of approximately 1,000 to 3,000 pounds. A fluid tight metal-to-metal seal is formed between the tapered outer side surface 102 on the seal member 100 and the tapered inner side surface 90 on the aluminum closure member 50. When the chamber 34 is filled with fluid under pressure, the fluid pressure in the chamber acts against an axially outer end surface 112 of the seal member 100 to urge the seal member away from the chamber and farther into the passage 82 of the closure member 50. The fluid pressure in the chamber 34 thus promotes maintenance of the fluid tight seal between the closure member 50 and the seal member 100.

The seal member 100 is preferably made from Kovar (trademark), an iron alloy which is commercially available from Westinghouse Electric Corp. The metal alloy Kovar (trademark) contains approximately 30% nickel, 17% cobalt, and 53% iron. The seal member 100 could, alternatively, be formed of another metal containing iron, such as a stainless steel alloy.

The coefficient of thermal expansion of the aluminum closure member 50 is greater than the coefficient of thermal expansion of the iron alloy from which the seal member 100 is made. During assembly of the inflator 12, the closure member 50 and the seal member 100 are preferably heated to a temperature which is above the range of temperatures to which the inflator 12 is exposed during normal operation of the vehicle in which the inflator is mounted. The seal member 100 is then press fit into the tapered end portion 88 of the passage 82 in the closure member 50. When the interengaged seal member 100 and closure member 50 subsequently cool, the closure member contracts more than the seal member does. The closure member 50 thus compresses the seal member 100 to promote further the formation of a fluid tight metal-to-metal seal between the closure member and the seal member. No additional sealant material is needed or used between the seal member 100 and the closure member 50.

The portion of the electrical conductor 20 which extends through the closure member 50 is formed as a metal pin 126. The metal pin 126 is preferably made from the metal alloy Kovar (trademark). One portion of the metal pin 126, which extends through the cylindrical main portion 86 (FIG. 3) of the passage 82 in the closure member 50, is enclosed by an electrically insulating jacket 130. Another portion of the metal pin 126, which extends through the opening 118 in the seal member 100 (FIG. 4), has an exposed cylindrical outer side surface 132. The exposed portion of the metal pin 126 extends into the chamber 34.

A body 134 (FIG. 4) of electrically insulating material is disposed in the larger diameter portion 122 of the opening 118 in the seal member 100. The body 134 of electrically insulating material is preferably made from glass. The body 134 of electrically insulating material could, alternatively, be made from a different material, such as a ceramic material.

The body of material 134 supports the metal pin 126 in position relative to the seal member 100. The body of material 134 also electrically insulates the metal pin 126 from the metal seal member 100. In addition, the body of material 134 forms a fluid tight seal between the outer side surface 132 of the metal pin 126 and the seal member 100. The body of material 134 thus blocks leakage of fluid from the chamber 34 along a path extending between the metal pin 126 and the seal member 100.

The electrical conductor passage 84 (FIG. 3) is identical in configuration to the electrical conductor passage 82. A tapered seal member 140 is disposed in a tapered, axially inner end portion of the passage 84. The seal member 140 has the same construction as the seal member 100. The electrical conductor 22 extends through a body 142 of electrically insulating material which is disposed in the seal member 140 and which has the same construction as the body 134 of insulating material. An uninsulated portion of the electrical conductor extends into the chamber 34. The body of material 142 and the seal member 140 block leakage of fluid from the chamber 34 along a path extending between the electrical conductor 22 and the closure member 50.

An igniter 24 is disposed in the chamber 34 (FIG. 2) in the vessel 30. The igniter 24 is electrically connected between the conductors 20 and 22. The igniter 24, as illustrated, includes a plurality of fine ignition wires, connected electrically in parallel, which can be resistively heated to a high temperature to cause ignition of the combustible gas mixture in the chamber 34. The ignition wires of the igniter 24 may, themselves, ignite and be burned rapidly in the combustible gas mixture. It should be understood that the igniter 24 could have a different construction. For example, the igniter 24 could comprise a pyrotechnic material which is ignitable upon the flow of electric current between the electrical conductors 20 and 22.

In the event of an impact to the vehicle for which inflation of the air bag 16 is desired, an electric signal is transmitted from the circuitry 18 (FIG. 1) to the inflator 12 along the electrical conductors 20 and 22. An electric current flows through the igniter 24 between the conductors 20 and 22 to actuate the igniter. When the igniter 24 is actuated, the combustible mixture of gases in the chamber 34 is ignited. Ignition of the combustible mixture of gases causes a rapid increase in the fluid pressure in the chamber 34. The thin wall portion 66 of the closure member 50 ruptures as a result of the increased pressure. Fluid under pressure is directed from the chamber 34 through the central passage 72 in the closure member 50 and into the radially extending passages 76. The inflation fluid is thence directed into the air bag 16. The air bag 16 inflates to help protect an occupant of the vehicle.

Figure 5:
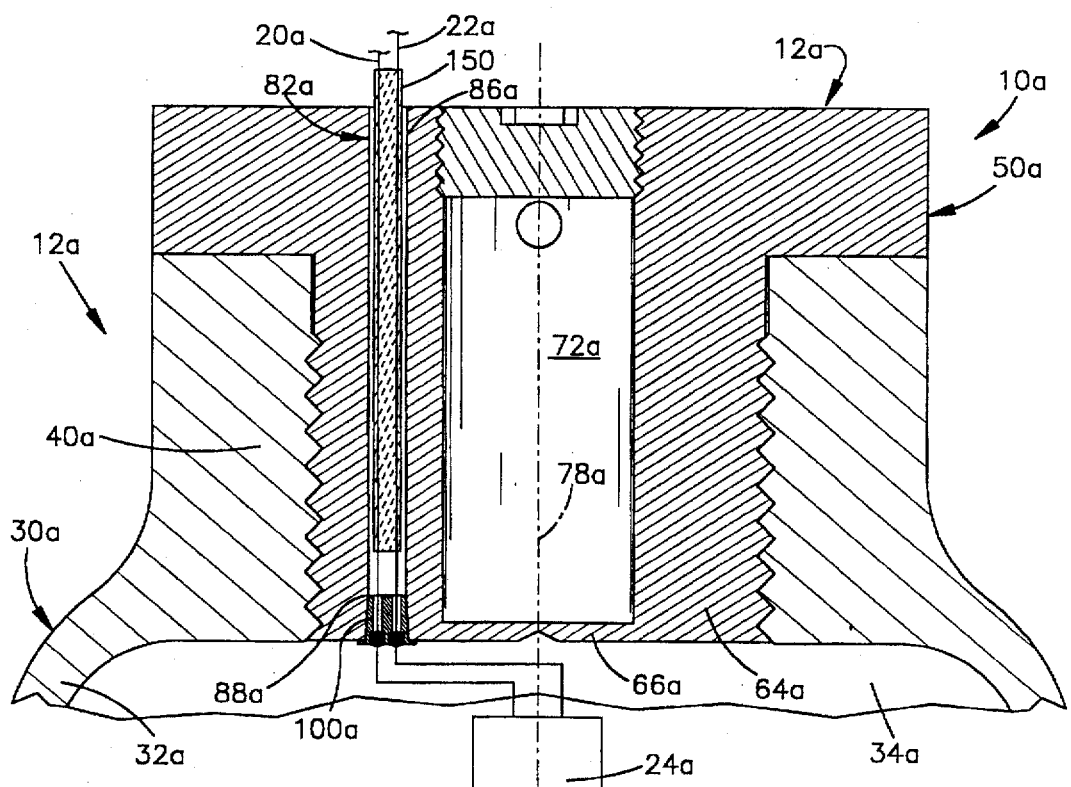
FIG. 5 is a view similar to FIG. 3, of an inflator which is constructed in accordance with a second embodiment of the present invention.
Figure 6:
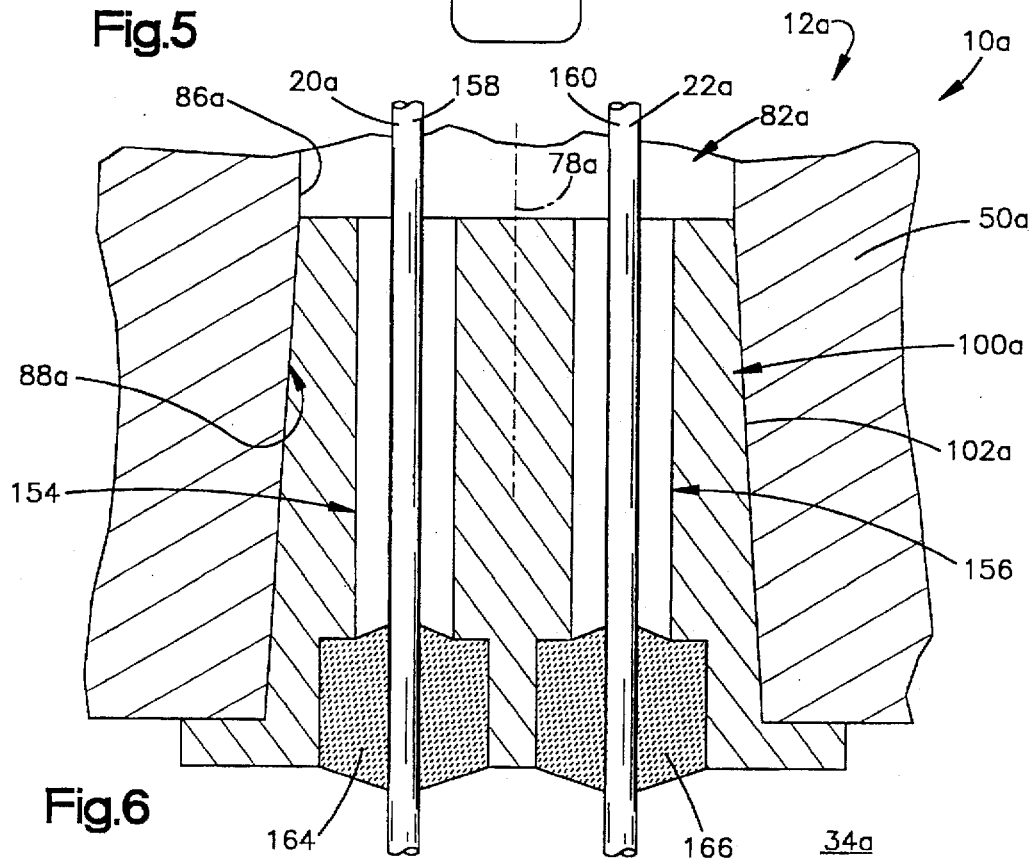
FIG. 6 is an enlarged view, similar to FIG. 4, of a portion of the inflator of FIG. 5.

FIGS. 5 and 6 illustrate portions of an inflator 12a which is constructed in accordance with a second embodiment of the invention. The inflator 12a is generally similar in construction to the inflator 12 illustrated in FIGS. 1–4. Thus, similar reference numerals are used to designate similar components, the suffix letter "a" being associated with the reference numerals of FIGS. 5 and 6.

The inflator 12a includes a metal vessel 30a having a side wall 32a which partially defines a chamber 34a. The chamber 34a contains a combustible mixture of gases under pressure. A metal closure member 50a is screwed into neck portion 40a of the vessel 30a.

Two electrical conductors 20a and 22a are disposed in a single cable 150 which is connected between an igniter 24a and vehicle electric circuitry (not shown) corresponding to the circuitry 18 of FIG. 1. The igniter 24a is disposed in the chamber 34a and is electrically connected between the electrical conductors 20a and 22a. In the embodiment of the invention illustrated in FIG. 5, the igniter 24a contains a pyrotechnic material, such as BKNO$_3$, which is ignitable in response to a flow of electric current between the conductors 20a and 22a.

A single electrical conductor passage 82a extends through a closure member 50a. The electrical conductor passage 82a has a cylindrical main portion 86a and an end portion 88a which tapers in a direction away from the chamber 34a. A single metal seal member 100a (FIG. 6) is disposed in the tapered end portion 88a of the passage 82a. The seal member 100a has a tapered outer side surface 102a which is pressed into engagement with the tapered end portion 88a of the passage 82a. A fluid tight metal-to-metal seal is formed between the outer side surface 102a of the seal member 100a and the tapered surface which defines the end portion 88a of the passage 82a.

Two parallel openings 154 and 156 (FIG. 6) are formed in the seal member 100a. A pair of metal pins 158 and 160, which form portions of the electrical conductors 20a and 22a, respectively, extend through the openings 154 and 156 in the seal member 100a and into the chamber 34a. The metal pins 158 and 160, as well as the seal member 100a, are preferably formed of Kovar (trademark) metal alloy.

Bodies 164 and 166 of electrically insulating material are disposed between the metal pins 158 and 160, respectively, and the tapered seal member 100a. The bodies 164 and 166 of electrically insulating material are, preferably, formed of glass. The bodies 164 and 166 of electrically insulating material form a fluid tight seal between the pins 158 and 160 and the closure member 50a.

Operation of the inflator 12a is similar to operation of the inflator 12. In the event the inflator 12a is actuated, an electric current flows through the igniter 24a between the conductors 20a and 22a. The igniter 24a ignites a combustible mixture of gases in the chamber 34a of the inflator 12a.

The pressure in the chamber 34a rises to a level at which a burst disk 66a ruptures. Inflation fluid flows from the chamber 34a through a fluid passage 72a and thence into an air bag (not shown). The air bag inflates into a position to help protect a vehicle occupant.

From the above description of the invention, those skilled in the art will perceive improvements, changes and modifications of the invention. For example, the electrical conductors which extend through the closure member could be connected with a device other than an igniter disposed in the chamber of an inflator. For example, one or more electrical conductors could be connected with a pressure sensor which provides an output indicative of the fluid pressure in the chamber of the inflator. Such improvements, changes and modifications within the skill of the art are intended to be covered by the appended claims.

Having described the invention, we claim:

1. An apparatus for inflating an inflatable vehicle occupant protection device, said apparatus comprising:

a vessel having a chamber for containing inflation fluid under pressure for inflating the inflatable device, said vessel having an opening into said chamber;

a plug located in said opening, said plug having a fluid passage for directing inflation fluid from said chamber to the inflatable device;

said plug having a tapered surface which at least partially defines an electrical conductor passage extending through said plug at a location spaced apart from said fluid passage;

a tapered seal member press fit in said electrical conductor passage in engagement with said tapered surface on said plug for blocking leakage of inflation fluid from said chamber through said electrical conductor passage; and an electrical conductor which extends through said electrical conductor passage and through said seal member, said electrical conductor extending into said chamber and being connectable with an electrical device in said chamber.

2. An apparatus as set forth in claim 1 wherein said tapered surface on said plug tapers axially in a direction away from said chamber, said seal member having an outer side surface which tapers axially in a direction away from said chamber and which is disposed in fluid tight sealing engagement with said tapered surface on said plug, said seal member having a portion which is exposed to the pressure of inflation fluid in said chamber to urge said seal member into sealing engagement with said plug.

3. An apparatus as set forth in claim 1 wherein said seal member includes surface means for at least partially defining an opening which extends through said seal member, said electrical conductor extending into said chamber through said opening in said seal member, said apparatus further comprising a body of electrically insulating material disposed in said opening in said seal member, said body of material electrically insulating between said electrical conductor and said seal member and blocking fluid leakage between said electrical conductor and said seal member.

4. An apparatus as set forth in claim 1 wherein each one of said seal member and said plug is made from metal.

5. An apparatus as set forth in claim 4 wherein said plug is made from aluminum and said seal member is made from a metal containing iron.

6. An apparatus as set forth in claim 5 wherein each one of said seal member and said electrical conductor is made from a metal alloy which contains iron, cobalt and nickel.

7. An apparatus as set forth in claim 1 comprising a burst disk disposed at a first end of said fluid passage adjacent to said chamber and blocking flow of fluid from said chamber into said fluid passage, said electrical device comprising an igniter which is disposed in said chamber at a location adjacent to said burst disk, said igniter being electrically actuatable in response to a flow of electric current through said electrical conductor to cause opening of said burst disk and flow of inflation fluid out of said chamber through said fluid passage.

8. An apparatus as set forth in claim 1 wherein said seal member is press fit into said plug with a force in the range of from about 1,000 pounds to about 3,000 pounds.

9. A closure assembly for blocking fluid flow through an opening in a wall defining a fluid chamber in an inflator for an inflatable vehicle occupant protection device, said closure assembly comprising:

a body portion having a fluid passage for directing fluid from the chamber to the inflatable device upon actuation of the inflator, said body portion being connectable with the wall of the inflator;

said body portion having an electrical conductor passage which is spaced apart from said fluid passage and which has a tapered end portion;

a tapered seal member which is disposed in said tapered end portion of said electrical conductor passage in sealing engagement with said body portion, said seal member having an opening which extends through said seal member;

an electrical conductor extending through said electrical conductor passage and through said opening in said seal member; and a body of electrically insulating material disposed in said opening in said seal member and enclosing a portion of said electrical conductor thereby to electrically insulate said electrical conductor from said seal member and to provide a fluid tight seal between said electrical conductor and said seal member.

10. A closure assembly as set forth in claim 9 wherein said body portion is made from aluminum and said seal member is made from an alloy containing iron, cobalt and nickel.

11. A closure assembly as set forth in claim 9 wherein said body portion includes a thin wall portion at one end of said fluid passage and a thick wall portion which extends around said thin wall portion, said thin wall portion being rupturable to enable fluid to flow from the chamber in the inflator, said thick wall portion having a tapered surface which defines said tapered end portion of said electrical conductor passage.

12. A closure assembly as set forth in claim 11 further comprising an igniter which is disposed adjacent to said thin wall portion of said body portion and which is connected with said electrical conductor, said igniter being actuatable to generate heat in response to a flow of electric current through said electrical conductor.

13. A closure assembly as set forth in claim 9 wherein said seal member is press fit into said plug with a force in the range of from about 1,000 pounds to about 3,000 pounds.

\* \* \* \* \*